United States Patent
Venters et al.

[11] Patent Number: 5,805,600
[45] Date of Patent: Sep. 8, 1998

[54] MECHANISM FOR PROVIDING FULL UTILIZATION OF HIGH DATA RATE SERIAL COMMUNICATION LINK CONVEYING DATA SOURCED FROM DATA TERMINAL EQUIPMENT AND COMPRESSED BY HIGH COMPRESSION RATIO DATA COMPRESSION-PROTOCOL ENGINE

[75] Inventors: W. Stuart Venters; Kevin W. Schneider, both of Huntsville, Ala.

[73] Assignee: Adtran, Inc., Huntsville, Ala.

[21] Appl. No.: 611,644

[22] Filed: Mar. 6, 1996

[51] Int. Cl.$^6$ ................................................. H04J 3/18
[52] U.S. Cl. ...................................... 370/477; 370/521
[58] Field of Search ..................................... 370/477, 521, 370/532, 535, 537, 538, 540, 542, 543, 544, 545; 348/384; 375/240

[56] References Cited

U.S. PATENT DOCUMENTS

| | | | |
|---|---|---|---|
| 5,280,532 | 1/1994 | Shenoi et al. | 370/477 |
| 5,297,147 | 3/1994 | Shimokasa | 370/477 |
| 5,506,844 | 4/1996 | Rao | 370/477 |
| 5,553,097 | 9/1996 | Dagher | 370/477 |

Primary Examiner—Ajit Patel
Attorney, Agent, or Firm—Charles E. Wands

[57] ABSTRACT

State of the art data compression-protocol engines provide high compression ratios for improving data transport over a high data rate serial communication link. However, a respective data port of data terminal equipment may not be capable of being clocked at a sufficiently high clock rate, which limits the performance of the data compression-protocol engine, and prevents full utilization of the available bandwidth of the serial link. To remedy this problem, data terminal equipment and data compression-protocol engine components that provide auxiliary data communication port connectivity are employed. Data from the data terminal equipment is clocked to the data compression-protocol engine over a plurality of parallel data paths. This increases the effective clock rate and enables the data compression-protocol engine to output a compressed data stream that fully utilizes the bandwidth of the network. The data compression-protocol engine is programmable for either parallel data path transport or single path data transport to the network interface. In one embodiment, plural data streams from the data terminal equipment are compressed and then time division multiplexed onto the network. In a second embodiment, the data streams are statistically multiplexed into a single compressed data stream to the network.

24 Claims, 2 Drawing Sheets

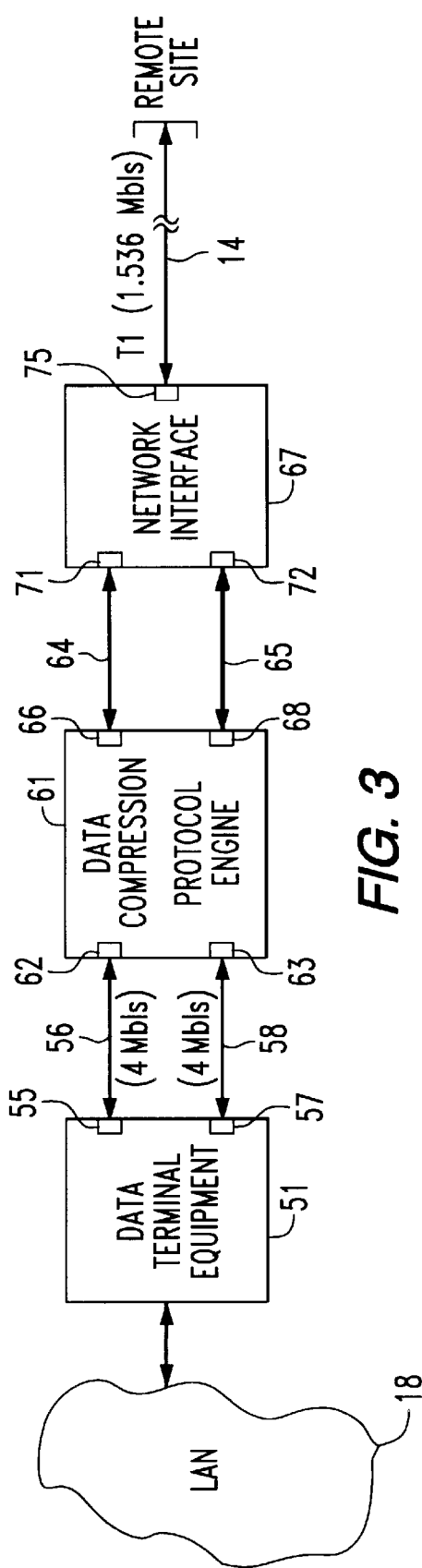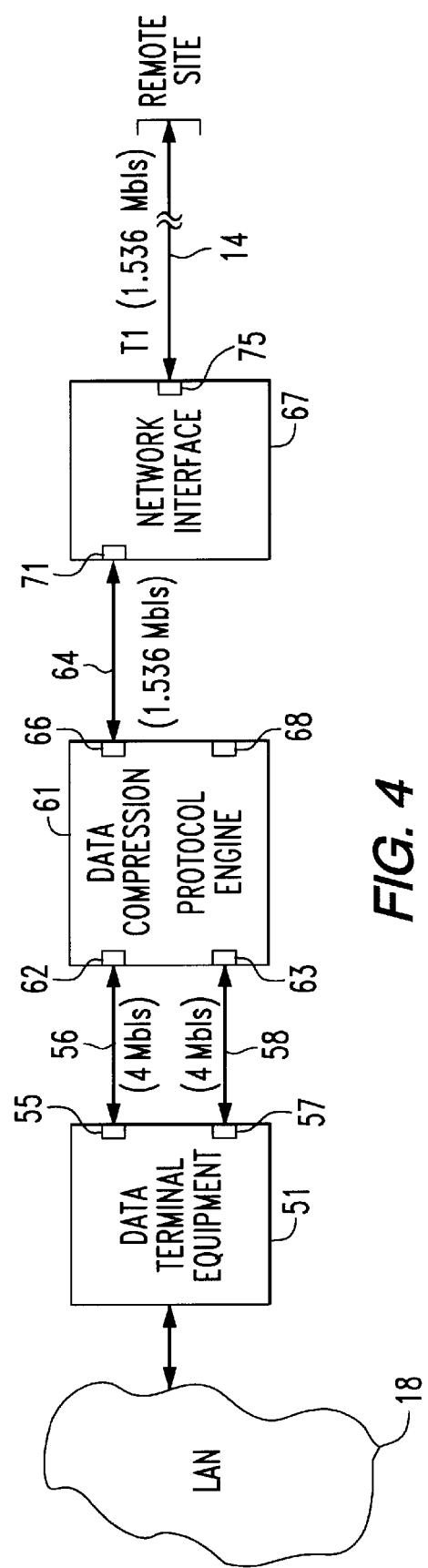

MECHANISM FOR PROVIDING FULL UTILIZATION OF HIGH DATA RATE SERIAL COMMUNICATION LINK CONVEYING DATA SOURCED FROM DATA TERMINAL EQUIPMENT AND COMPRESSED BY HIGH COMPRESSION RATIO DATA COMPRESSION-PROTOCOL ENGINE

FIELD OF THE INVENTION

The present invention relates in general to communication systems, and is particularly directed to a mechanism for optimally utilizing the signal processing capacity of a data compression-protocol engine, by way of which digital data sourced from digital terminal equipment is compressed and coupled (statistically/time division multiplexed) through a network interface to a high data rate serial communication link, such as a T1 (1.536 Mb/s) data link transporting either channelized data (e.g., a plurality of (e.g. twenty-four) digital subscriber line (DSL) channels) or non-channelized data between geographically separated sites, and thereby optimizing utilization of the high data rate digital communication link.

BACKGROUND OF THE INVENTION

The transmission of digital data over a high data rate serial communication network, such as a high data rate T1 time division multiplexed (TDM) telecommunication network transporting digitized telephone signals at a data rate of 1.536 Mb/s, may involve non-channelized serial transport of digital data signals, or channelized transmission that comprises the assembly of plural digital subscriber line (DSL) telephone channels into successive frames carrying multiple channels of digital data. For example, a typical DS1 frame transported over a T1 link may contain twenty-four TDM telephone signalling channels, consisting of eight bits per channel (plus a framing bit for a total of 193 bits per frame).

As diagrammatically illustrated in FIG. 1, a T1 network termination site 10, such as a central office site, or a data terminal equipment site, typically includes a network-to-data terminal equipment interface 12, such as a T1-rate customer service unit/data service unit (CSU/DSU), or TSU, which terminates and interfaces a T1 network 14 with data terminal equipment (DTE) 16, such as a local area network (LAN) 18 bridge, a router, a computer, computer aided design systems, teleconferencing equipment and the like.

In order to optimize the use of the available bandwidth of the T1 network 14, a data compression-protocol engine 22 may be installed between the data terminal equipment 16 and the network interface 12, as diagrammatically illustrated in FIG. 2. The engine 22 includes (HDLC-based) transceivers through which the data is interfaced with a network interface 12 for application to and receipt from the network 14, and is operative to compress and assemble outgoing (to be transmitted) digital data (for example, a text file sourced from a personal computer data base), prior to transmission over the network 14, in accordance with a prescribed link compression and transmission protocol resident in its control processor. For incoming data received from the network, the data compression-protocol engine 22 decompresses the data for application by (HDLC-based) transceivers to the data terminal equipment 16.

The signal processing capabilities of data compression-protocol engines provide relatively high compression ratios that are designed to fully utilize the available bandwidth of the T1 link, and will readily accommodate a highly compressible data stream from data terminal equipment that is capable of being clocked up to a relatively high maximum rate (e.g. up to a maximum clock rate of 8 MHz), for transmission at the 1.536 Mb/s data rate of the T1 link. However, there exist data terminal equipments which may not be able to be clocked at a data rate substantially in excess of T1/E1 data rates, such as at a data rate on the order of 8 Mb/s, since such equipment is customarily designed for direct connection to and is constrained by the data rate of the single serial interface to a T1/E1 link. As a result, the augmented performance capabilities of a data compression-protocol engine installed between such data terminal equipment and the network interface cannot be fully exploited.

SUMMARY OF THE INVENTION

In accordance with the present invention, the above described link utilization deficiency problem, associated with data terminal equipment whose maximum operable clock rate is less than that which will take full advantage of the available compression ratio of an associated data compression operator and optimize the occupancy of the available bandwidth of the (T1) communication link, is effectively remedied by a new and improved interconnection of data terminal equipment and data compression-protocol engine components.

In particular, the present invention is directed to the use of auxiliary or redundant data communication port connectivity of such components that enables data transport therethrough to be enhanced (e.g., effectively doubled), so that full advantage can be taken of the data compression capabilities of the data compression-protocol engine, thereby optimizing utilization of the high data rate digital communication network link over which the compressed digital data is transmitted to a destination site.

Pursuant to a first embodiment of the invention, use is made of the availability of more than a single data port (e.g., a pair of data ports) of the data terminal equipment to provide a plurality (e.g. two) of parallel data streams. The clock rate at which each individual data port can be clocked can vary up to a maximum clock rate that is less than the clock rate that can fully utilize the compression capability of the multiport data compression-protocol engine. By using multiple ports of the data terminal equipment to transport the data at up to the maximum clock rate for each port, and combining the parallel transported data streams at the data compression-protocol engine, the effective clock rate of the data supplied to the data compression-protocol engine can be increased (doubled in the case of two parallel channels) to an optimal data rate (e.g. 8 Mb/s for the case where a respective port/channel of the data terminal equipment can be clocked at a clock rate no higher than 4 MHz), so as to enable the compressed data output by the data compression-protocol engine to fully utilize the high data rate capability of the network.

The data compression-protocol engine is preferably one which is programmable for either parallel data path transport or single path data transport to the (T1) network interface, and may include respective sets (pairs) of high level data link control transceiver units that interface each of the data terminal equipment and the network interface with a communications (compression and multiplexing) processor. The data compression-protocol engine is operative to compress the digital data streams clocked over the parallel data links from the terminal equipment, which are then conveyed on respective compressed data channels to the network interface and multiplexed onto the T1 TDM link for delivery to a remote network site.

As a non-limiting example, the highest rate at which an individual port (physical or logical) of the data terminal equipment can be clocked (which is insufficient to fully utilize the compression ratio of the data compression protocol engine) may be on the order of only 4 MHz. If such a non-compressed 4 Mb/s data channel were to be applied to a data compression-protocol engine that is capable of achieving a compression ratio greater than the ratio of the input clock rate (4 MHz) to the data rate (1.536 Mb/s) of the serial communications link, the available bandwidth of the serial link would be under-utilized.

However, by using an extra or auxiliary available port of the data terminal equipment to enable a pair of digital data streams to be clocked from the terminal equipment to the compression-protocol engine, each at a rate of up to a maximum clock rate of 4 MHz, then for the parameter values of the above example, the data compression protocol engine can compress multiple two 4 Mb/s input data streams into a pair of constant data rate (768 Kb/s) compressed data streams. Each compressed 768 Kb/s data stream is coupled from the compression-protocol engine over a respective compressed data stream link to the (T1) network interface and is asserted during a prescribed number of the time division multiplexed time slots of the 1.536 Mb/s network link.

In the outgoing (towards the T1 network) direction, the network interface multiplexes the two fixed rate, compressed 768 Kb/s digital data streams onto the serial digital communication (T1) link as a multiplexed compressed data stream at the T1 data rate of 1.536 Mb/s, thereby increasing the utilization of the T1 link, compared to its reduced capacity in the case of delivering only a single, 4 Mb/s data channel to the data compression-protocol engine by the data terminal equipment.

In the incoming direction from the T1 network, the network interface subdivides a received 1.536 Mb/s multiplexed compressed data stream into separate (768 Mb/s) time slot sub-groups or channels, which are transported over parallel links as demultiplexed compressed data streams to the data compression-protocol engine. The data compression-protocol engine decompress these two 'sub-T1 rate' compressed digital data streams into respective decompressed digital data streams, each of which is clocked at the DTE clock rate (e.g., 4 Mb/s) to a respective port of the data terminal equipment.

In accordance with a second embodiment of the invention, the data compression-protocol engine is configured to statistically multiplex multiple data streams supplied on the less than optimum clock rate parallel channels from multiple ports of the data terminal equipment into a single network bit stream and to supply a compressed bit stream to the network interface. For the above parametric example of the first embodiment, where the terminal equipment has a pair of data ports, each of which can be clocked at a variable clock rate of up to 4 MHz, the data compression protocol engine may statistically multiplex these two channels into a single serial data stream having a data rate of up to 8 Mb/s, which is then compressed by the data compression-protocol engine for transport through the network interface at the 1.536 Mb/s data rate of the T1 link.

In the incoming direction from the T1 network, the network interface couples the 1.536 Mb/s multiplexed compressed data stream to the data compression-protocol engine, which decompresses the combined T1 rate data stream, and then demultiplexes the decompressed data stream into a pair of decompressed digital data streams. Each digital data stream is then clocked into the data terminal equipment at the reduced clock rate (e.g. up to 4 MHz.).

BRIEF DESCRIPTION OF THE DRAWINGS

FIG. 3 diagrammatically illustrates the manner in which the network interface unit of FIG. 2 is configured in accordance with a first embodiment of the present invention to provide plural parallel data channels between the data compression-protocol engine and each of the data terminal equipment and the network interface; and FIG. 4 diagrammatically illustrates the manner in which the network interface unit of FIG. 2 is configured in accordance with a second embodiment of the present invention to provide parallel data channels between the data terminal equipment and the data compression-protocol engine, and a single statistically multiplexed channel between the data compression-protocol engine and the network interface.

DETAILED DESCRIPTION

Figure 1:
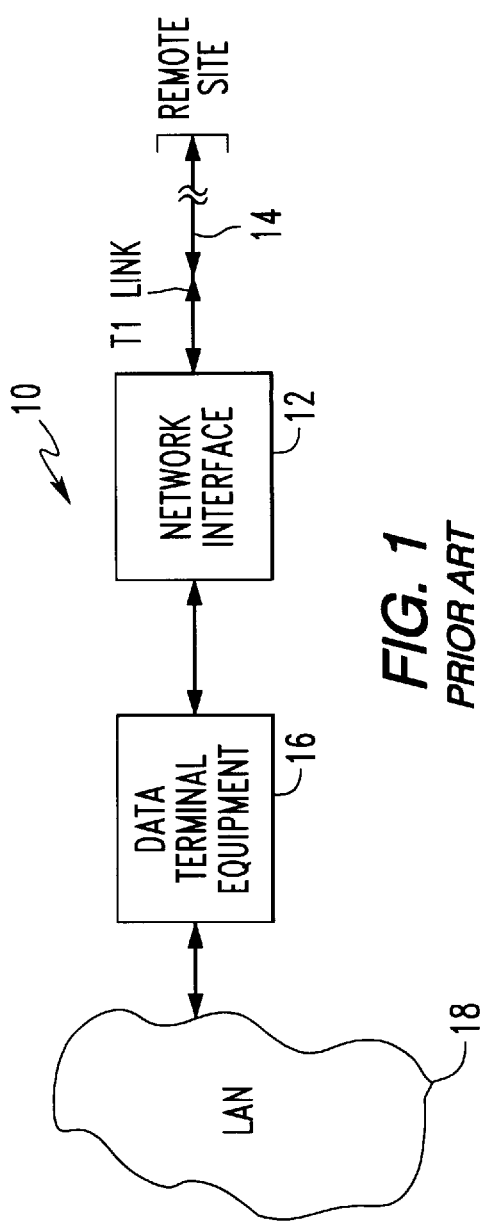
FIG. 1 is a simplified diagrammatic illustration of a digital data communication site for a time division multiplexed digital communications network.

Before describing in detail the new and improved arrangement of a data compression-protocol engine and associated terminal equipment and network interface components that are interconnected in accordance with the present invention to effect optimal data rate, parallel channel data transport, and thereby effectively double the data throughput to the data compression-protocol engine, it should be observed that the invention resides primarily in what is effectively a prescribed arrangement of conventional digital communication and signal processing hardware components, and associated compression-protocol control software resident in the transceiver equipment at a respective end of digital communication network.

Consequently, the invention has been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

Figure 2:
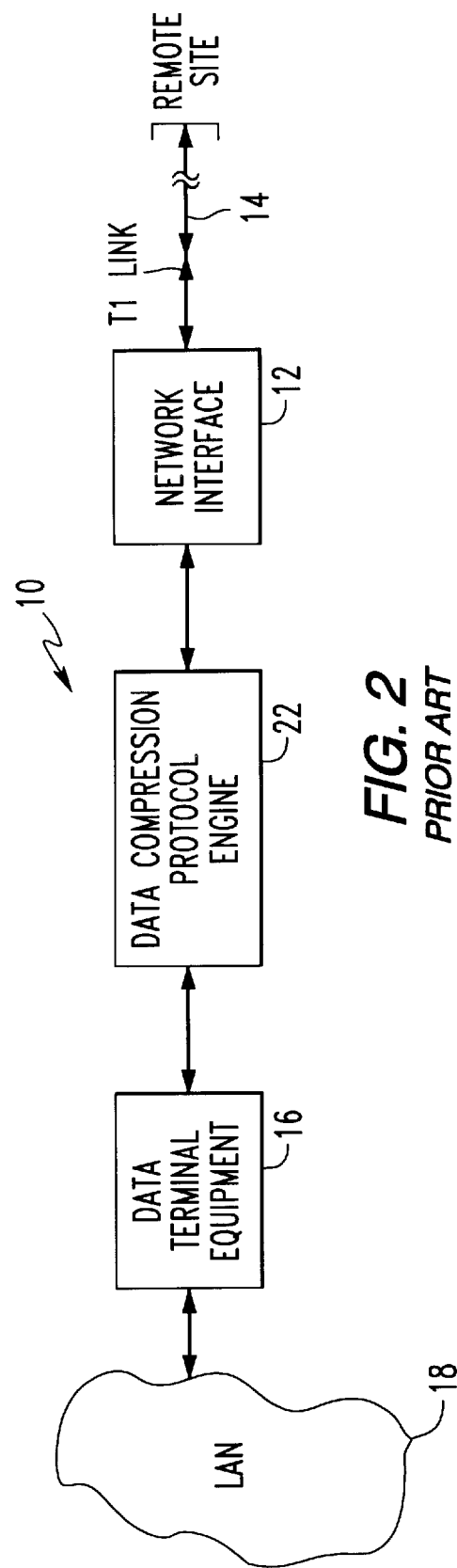
FIG. 2 is a simplified diagrammatic illustration of the digital data communication site of FIG. 1 in which a compression engine has been installed.

FIG. 3 diagrammatically illustrates the manner in which the network interface unit of FIG. 2 may be modified in accordance with a first embodiment of the present invention to provide a plurality of parallel data channels between a data compression-protocol engine and each of data terminal equipment and a network interface of a network termination site. As a non-limiting example, the data terminal equipment, shown at 51, may comprise a Cisco 2501 Router, manufactured by Cisco Systems Inc., San Jose, Calif., which is coupled to a local area network (LAN) 18. Advantageously, such terminal equipment has a pair of data ports 55 and 57, the clock rate of each of which can be varied up to a maximum clock rate of 4 Mb/s.

It should be observed that the present invention is not limited to this or any other type of data terminal equipment which provides only a single auxiliary data port. The invention can also be employed with data terminal equipments having more than a pair of data ports. For example, equipment having three data ports, each being capable of being clocked at a maximum clock rate of 4 MHz, can be employed to provide a combined data rate of up to 12 Mb/s to a data compression-protocol engine 61. Such terminal equipment would be preferred for use with a T1 data rate (1.536 Mb/s) in the case of a data compression-protocol engine capable of providing a compression ratio on the order of 8:1, for example. In accordance with the present example, data ports 55 and 57 are employed to transport (packetized) digital data over respective links 56 and 58, which are ported to dual ports 62 and 63, respectively of data compression-protocol engine 61.

Data compression-protocol engine 61 may comprise a digital data transceiver unit (such as a Model 68360 bidirectional digital communications device, manufactured by Motorola Inc.), which contains first and second transmit/receive pairs of serial communications controller units and an attendant microprocessor (including associated memory/buffer storage for incoming and outgoing data frames), providing for direct porting of data on each of data links 56 and 58 with respective ports 55 and 57 of the data terminal equipment 51.

Digital data sourced from data terminal equipment 51 to be transmitted over the network 14 at a prescribed baud rate is packetized by a digital data transceiver unit into a limited frame size, with each data frame being formatted in accordance with a prescribed digital data encapsulation protocol (e.g. High level Data Link Control (HDLC), such as TIA/EIA-655 protocol, as a non-limiting example), and an optional compression mechanism (e.g. conventional STAC compression, such as, but not limited to, a STAC LZS compression algorithm (ANSI X.241).

The serial communications controller (HDLC) units contained in compression-protocol engine 61 are operative to interface each of the data terminal equipment 51 and a network interface 67 with the engine's internal communications processor. For the non-limiting example of a data terminal equipment port being capable of being clocked up to a maximum clock rate of 4 Mhz, data compression-protocol engine 61 is operative to compress digital data, clocked thereto over data links 56 and 58 (at up to the 4 Mb/s clock rate) into first and second compressed digital data streams, each having a constant data rate of 768 Mb/s, and conveyed from engine 61 via ports 66 and 68 over TDM links 64 and 65 to respective ports 71 and 72 network interface 67. Since the use of the pair of data links 56 and 58 allows the full signal processing capacity of the data compression-protocol engine 61 to be employed, the compressed data stream will optimally result in full utilization of the available time slots of the T1 serial communication link 14.

For this purpose, in the outgoing (towards the T1 network) direction, network interface 67 is operative to time division multiplex the two compressed 768 Kb/s digital data streams supplied thereto on links 64 and 65 via port 75 onto the serial digital communication (T1) link 14, as a serial, time division multiplexed compressed data stream at the T1 data rate of 1.536 Mb/s, thereby increasing the utilization of the T1 link, compared to its reduced capacity were only a single 4 Mb/s data channel available from data terminal equipment 51 to the data compression protocol engine 61.

For the incoming direction (from the T1 network 14), the network interface 67 subdivides a received 1.536 Mb/s multiplexed compressed data stream into separate time slot sub-groups or channels, which are transported as demultiplexed compressed data streams over data links 64 and 65 to the data compression-protocol engine 61 at a fixed data rate of 768 Kb/s. Data compression-protocol engine 61 decompresses the two compressed digital data streams into respective first and second decompressed digital data streams, with the decompressed data streams then being clocked from respective ports 62 and 63 over data links 56 and 58, at a fixed clock rate (4 MHz) containing idle bits as necessary, to respective data ports 55 and 57 of the data terminal equipment 51.

FIG. 4 diagrammatically illustrates the manner in which the compression-protocol engine of the network interface unit of FIG. 2 may be configured in accordance with a second embodiment of the invention to statistically multiplex the two compressed data streams clocked from the dual ports of the terminal equipment 51 into a single network bit stream to the network interface 67. As noted above, the compression-protocol engine 61 may be programmed for either parallel data path transport (as in the first embodiment of FIG. 3) or single path data transport.

In the second embodiment of FIG. 4, for single path data transport, compression-protocol engine 61 is programmed to perform statistical multiplexing of the pair of (up to 4 Mb/s) digital data streams clocked from data terminal equipment 51 over links 56 and 58 into a single data stream and then compress the resulting multiplexed data stream into a compressed multiplexed data stream, that is conveyed over a single link, such as link 64, to port 71 of the network interface 67. Link 64 is clocked at the 1.536 Mb/s data rate of the T1 link. Namely, the combination of statistical multiplexing of the two (up to 4 Mb/s) input data streams from the data terminal equipment 51, followed by compression of the multiplexed data stream, produces a single data stream at port 75 at the T1 data rate of 1.536 Mb/s, for transport over link 64 to the network interface unit 67.

In the incoming direction (from the T1 network), network interface 67 couples an incoming 1.536 Mb/s multiplexed compressed data stream over link 64 to compression-protocol engine 61 at the T1 data rate of 1.536 Mb/s. Engine 61 decompresses the combined T1 rate data stream and then demultiplexes the decompressed data into a pair of non-compressed digital data streams that are clocked onto parallel data links 56 and 58 for application to respective ports 55 and 57 of data terminal equipment 51 at the first clock rate (e.g., 4 Mb/s).

As will be appreciated from the foregoing description, the above described high data rate link utilization deficiency problem, that results from an incompatibility between the augmented compression ratio of a compression-protocol engine and the highest clock rate at which data may be supplied to the engine over an individual data link from data terminal equipment, is effectively remedied in accordance with the present invention by employing data terminal and compression-protocol engine components that provide auxiliary or redundant data communication port connectivity, thereby increasing data throughput from the data terminal equipment to the engine, so that the resultant data stream output by the compression-protocol engine will fully utilize the high data rate digital communication link.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed:

1. A method of interfacing digital data signals supplied by digital terminal equipment with a serial digital communication link operating at a data transmission rate less than a first clock rate at which said digital terminal equipment can be clocked, comprising the steps of:

(a) porting digital data signals from said digital terminal equipment as a plurality of digital data streams, each of which is clocked at said first clock rate;

(b) coupling said plurality of digital data streams to a plurality of input data ports of a data compression-protocol engine, which is operative to compress said digital data streams coupled thereto into a plurality of compressed digital data streams, each having a data rate less than said first clock rate; and (c) coupling said plurality of compressed digital data streams provided by said data compression-protocol engine over data paths that are clocked at a second clock rate, less than said data rate, to a network interface, which is operative to time division multiplex said plurality of compressed digital data streams onto said serial digital communication link as a time division multiplexed compressed data stream having said data rate.

2. A method according to claim 1, further comprising the steps of:

(d) coupling a multiplexed compressed data stream, received by said network interface from said serial digital communication link at said data rate, into a plurality of compressed digital data streams at said second clock rate;

(e) coupling said plurality of compressed digital data streams provided in step (c) to said data compression-protocol engine, which is operative to decompress said plurality of compressed digital data streams coupled thereto into a plurality of decompressed digital data streams, each having said first clock rate; and (f) coupling said plurality of decompressed digital data streams at said first clock rate to said data terminal equipment.

3. A method according to claim 1, wherein said first clock rate corresponds to a clock rate of 4 Mb/s.

4. A method according to claim 3, wherein said data rate corresponds to a data rate of 1.536 Mb/s.

5. A method according to claim 4, wherein said second clock rate corresponds to a clock rate of 768 Kb/s.

6. A method of interfacing digital data signals supplied to an input port of an individual digital terminal equipment with a serial digital communication link operating at a data transmission rate less than a first clock rate at which said individual digital terminal equipment can be clocked, comprising the steps of:

(a) dividing said digital data signals supplied to said input port of said individual digital terminal equipment from multiple output ports of said individual digital terminal equipment as a plurality of digital data streams, each of which is clocked at said first clock rate; and (b) coupling said plurality of digital data streams to a data compression-protocol engine, which is operative to statistically multiplex said plurality of digital data streams coupled thereto into a compressed statistically multiplexed digital data stream having said data transmission rate, which is coupled over a data link clocked at said data transmission rate to a network interface, which is operative to time division multiplex said compressed statistically multiplexed digital data stream onto said serial digital communication link.

7. A method according to claim 6, further comprising the steps of:

(c) coupling a multiplexed compressed digital data stream, received by said network interface from said serial digital communication link at said data transmission rate, to said data compression-protocol engine, said data compression-protocol engine decompressing said multiplexed compressed digital data stream into a plurality of decompressed digital data streams, each having said first clock rate; and (d) clocking said plurality of decompressed digital data streams at said first clock rate to said data terminal equipment.

8. A method according to claim 6, wherein said first clock rate corresponds to a clock rate of 4 Mb/s.

9. A method according to claim 8, wherein said data rate corresponds to a data rate of 1.536 Mb/s.

10. An arrangement for interfacing digital data signals supplied by digital data terminal equipment with a serial digital communication link operating at a data transmission rate less than a first clock rate at which said digital terminal equipment can be clocked, comprising:

plural data paths respectively coupled to plural data ports of said digital data terminal equipment, each data path being clocked at said first clock rate, so as to provide plural digital data streams from said plural ports of said digital data terminal equipment;

a digital data compression-protocol engine having a plurality of input data ports coupled to said plural data paths and being operative to compress said plurality of digital data streams into a plurality of compressed digital data streams, each having a data rate less than said first clock rate; and a network interface to which said compressed digital data streams output by said compression-protocol engine are clocked at a second clock rate, less than said data transmission rate, said network interface being operative to time division multiplex said compressed digital data streams onto said serial digital communication link as a time division multiplexed compressed data stream having said data transmission rate.

11. An arrangement according to claim 10, wherein said network interface is coupled to receive a multiplexed compressed data stream from said serial digital communication link at said data transmission rate, and to demultiplex said multiplexed compressed data stream into a plurality of compressed digital data streams to said data compression-protocol engine at said second clock rate, and wherein said data compression-protocol engine is operative to decompress said compressed digital data streams into a plurality of decompressed digital data streams, each having said first clock rate, and to couple said decompressed digital data streams at said first clock rate to said data terminal equipment.

12. An arrangement according to claim 10, wherein said first clock rate corresponds to a clock rate of 4 Mb/s.

13. An arrangement according to claim 12, wherein said data rate corresponds to a data rate of 1.536 Mb/s.

14. An arrangement according to claim 13, wherein said second clock rate corresponds to a clock rate of 768 Kb/s.

15. An arrangement for interfacing digital data signals supplied to an input port of the same individual digital terminal equipment with a serial digital communication link operating at a data transmission rate less than a first clock rate at which said same individual digital terminal equipment can be clocked, comprising:

plural data paths respectively coupled to plural data ports of said same individual digital data terminal equipment, each data path being clocked at said first clock rate, so as to provide plural digital data streams from said plural ports of said same individual digital data terminal equipment;

a data compression-protocol engine having a plurality of input ports to which said plurality of digital data streams clocked over said plural data paths are coupled, said data compression-protocol engine being operative to statistically multiplex and compress said plurality of digital data streams into a compressed, statistically multiplexed digital data stream, having said data transmission rate; and a network interface, which is coupled to said data compression-protocol engine and is operative to transmit said compressed, statistically multiplexed digital data stream onto said serial digital communication link at said data transmission rate.

16. An arrangement according to claim 15, wherein said network interface is operative to couple a multiplexed compressed digital data stream received from said serial digital communication link at said data transmission rate to said data compression engine, said data compression-protocol engine being operative to decompress said multiplexed compressed digital data stream into a plurality of decompressed digital data streams, each being coupled to said data terminal equipment at said first clock rate.

17. An arrangement according to claim 15, wherein said first clock rate corresponds to a clock rate of 4 Mb/s.

18. An arrangement according to claim 17, wherein said data rate corresponds to a data rate of 1.536 Mb/s.

19. For use with an arrangement for interfacing digital data signals, supplied to an input port of the same individual data terminal equipment and output by said same individual data terminal equipment at a first clock rate, with a data compression-protocol engine, which is operative to compress said digital data signals into a compressed data stream for application to a high data rate serial digital communication link, operating at a data transmission rate less than said first clock rate, said data compression-protocol engine having a compression ratio which, when applied to said digital data signals supplied by said data terminal equipment at said first clock rate, produces compressed data having a data rate less than that which fully utilizes the available bandwidth associated with said data transmission rate of said serial digital communication link, a method of enhancing the ability of said data compression-protocol engine to output compressed data that more fully utilizes the available bandwidth of said serial digital communication link, comprising the steps of:

(a) clocking a plurality of output ports of said same individual data terminal equipment at said first clock rate, to provide a plurality of digital data streams that are input to said data compression-protocol engine at an effective data rate that is increased relative to said first clock rate; and (b) causing said data compression-protocol engine to process said digital data streams into a compressed multiplexed digital data stream, which is coupled by said network interface onto said serial digital communication link at said data transmission rate.

20. A method according to claim 19, wherein step (b) comprises (b1) causing said data compression-protocol engine to compress said digital data streams into a plurality of compressed digital data streams, each having a data rate less than said first clock rate; and (b2) coupling said plurality of compressed digital data streams provided by said data compression-protocol engine in step (b1) over data paths that are clocked at a second clock rate, less than said data transmission rate, to said network interface, which is operative to time division multiplex said plurality of compressed digital data streams onto said serial digital communication link as a time division multiplexed compressed data stream having said data transmission rate.

21. A method according to claim 19, wherein step (b) comprises (b1) causing said data compression-protocol engine to statistically multiplex said digital data streams into a compressed multiplexed digital data stream having said data transmission rate; and (b2) coupling said a compressed multiplexed digital data stream provided by said data compression-protocol engine in step (b1) over a data path clocked at said data transmission rate to said network interface, which is operative to transmit said compressed multiplexed digital data stream onto said serial digital communication link at said data transmission rate.

22. A method according to claim 19, wherein said first clock rate corresponds to a clock rate of 4 Mb/s.

23. A method according to claim 22, wherein said data transmission rate corresponds to a data rate of 1.536 Mb/s.

24. A method according to claim 20, wherein said second clock rate corresponds to a clock rate of 768 Kb/s.

* * * * *